United States Patent
Kolze et al.

(10) Patent No.: US 8,804,607 B2
(45) Date of Patent: Aug. 12, 2014

(54) METHOD AND APPARATUS FOR MAINTAINING SYNCHRONIZATION IN A COMMUNICATION SYSTEM

(71) Applicant: Broadcom Corporation, Irvine, CA (US)

(72) Inventors: Thomas Kolze, Phoenix, AZ (US); Bruce Currivan, Irvine, CA (US); Niki Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/875,127

(22) Filed: May 1, 2013

(65) Prior Publication Data
US 2013/0243136 A1 Sep. 19, 2013

Related U.S. Application Data

(63) Continuation of application No. 10/809,685, filed on Mar. 26, 2004, now Pat. No. 8,457,040.

(60) Provisional application No. 60/461,188, filed on Apr. 9, 2003.

(51) Int. Cl.
*H04B 7/212* (2006.01)

(52) U.S. Cl.
USPC .......................................................... 370/324

(58) Field of Classification Search
None
See application file for complete search history.

(56) References Cited

U.S. PATENT DOCUMENTS

| | | |
|---|---|---|
| 6,243,369 B1 | 6/2001 | Grimwood et al. |
| 6,356,555 B1 | 3/2002 | Rakib et al. |
| 6,430,148 B1 | 8/2002 | Ring |
| 6,449,291 B1 | 9/2002 | Burns et al. |

(Continued)

FOREIGN PATENT DOCUMENTS

EP    1 024 618 A2    8/2000

OTHER PUBLICATIONS

Non-Final Rejection mailed Jul. 16, 2007 for U.S. Appl. No. 10/809,893, filed Mar. 26, 2004, 14 pgs.

(Continued)

*Primary Examiner* — Andrew Lai
*Assistant Examiner* — Leon Andrews
(74) *Attorney, Agent, or Firm* — Sterne, Kessler, Goldstein & Fox P.L.L.C.

(57) ABSTRACT

A central entity and/or a remote device in a communication system are designed to address the problem of maintaining upstream synchronization in the remote device after loss of the downstream signal. One issue of particular importance is maintaining upstream transmissions from the remote device in an S-CDMA (or perhaps S-TDMA) mode that do not degrade performance of the communication system via poor upstream timing or a need for re-ranging. By providing novel functionality at the central entity for synchronizing first and second downstream signals and/or by providing novel functionality at the remote device for determining a symbol clock offset between a first terminated downstream signal and a second re-acquired downstream signal, embodiments of the present invention facilitate maintenance of synchronization through the loss of the downstream signal, thereby minimizing the need for re-ranging and avoiding poorly timed upstream bursts.

20 Claims, 10 Drawing Sheets

(56) References Cited

U.S. PATENT DOCUMENTS

| | | | |
|---|---|---|---|
| 6,539,050 | B1 | 3/2003 | Lee et al. |
| 6,771,590 | B1 | 8/2004 | Marchok et al. |
| 7,130,658 | B2 | 10/2006 | Mennenga et al. |
| 7,154,915 | B1 | 12/2006 | Ushirokawa et al. |
| 7,280,564 | B1 | 10/2007 | Geile et al. |
| 7,548,558 | B2 | 6/2009 | Rakib et al. |
| 7,701,978 | B2 | 4/2010 | Kolze et al. |
| 8,457,040 | B2 | 6/2013 | Kolze et al. |
| 2001/0033611 | A1 | 10/2001 | Grimwood et al. |
| 2001/0038647 | A1 | 11/2001 | Bernath et al. |
| 2001/0055319 | A1 | 12/2001 | Quigley et al. |
| 2002/0085520 | A1 | 7/2002 | Sydon et al. |
| 2002/0154655 | A1 | 10/2002 | Gummalla et al. |
| 2002/0176481 | A1* | 11/2002 | Shiina et al. ............ 375/130 |
| 2002/0186803 | A1 | 12/2002 | Kolze |
| 2003/0035442 | A1 | 2/2003 | Eng |
| 2004/0095963 | A1* | 5/2004 | Rakib ..................... 370/503 |
| 2004/0100985 | A1 | 5/2004 | Pantelias et al. |
| 2004/0141759 | A1 | 7/2004 | Stiscia et al. |
| 2004/0202202 | A1 | 10/2004 | Kolze et al. |
| 2004/0202203 | A1 | 10/2004 | Kolze et al. |
| 2007/0286263 | A1 | 12/2007 | Kwentus et al. |
| 2008/0089399 | A1 | 4/2008 | Azenko et al. |

OTHER PUBLICATIONS

Final Rejection mailed Jan. 22, 2008 for U.S. Appl. No. 10/809,893, filed Mar. 26, 2004, 17 pgs.

Non-Final Rejection mailed Aug. 22, 2008 for U.S. Appl. No. 10/809,893, filed Mar. 26, 2004, 17 pgs.

Final Rejection mailed Feb. 23, 2009 for U.S. Appl. No. 10/809,893, filed Mar. 26, 2004, 16 pgs.

Non-Final Rejection mailed Jun. 23, 2009 for U.S. Appl. No. 10/809,893, filed Mar. 26, 2004, 8 pgs.

Notice of Allowance mailed Dec. 1, 2009 for U.S. Appl. No. 10/809,893, filed Mar. 26, 2004, 8 pgs.

English Abstract for European Patent No. EP 1 024 618 A2, published Aug. 2, 2000, 1 page, from http://vs.espacenet.com.

"Data-Over-Cable Service Interface Specifications: Radio Frequency Interface Specification" SP-RFIv2.0-I03-021218, 2002 Cable Television Laboratories, Inc., Version 2.0, Dec. 18, 2002, 1-250 pgs.

"Data-Over-Cable Service Interface Specifications: Radio Frequency Interface Specification" SP-RPIv2.0-I03-021210 2002 Cable Television Laboratories, Inc., Version 2.0, Dec. 18, 2002, 251-506 pgs.

European Search Report, issued in Appl. No. EP04008793.4, dated Dec. 8, 2005, (3 pages).

* cited by examiner

METHOD AND APPARATUS FOR MAINTAINING SYNCHRONIZATION IN A COMMUNICATION SYSTEM

CROSS REFERENCE TO RELATED APPLICATIONS

This Application is a continuation of U.S. patent application Ser. No. 10/809,685 filed Mar. 26, 2004, which claims priority to U.S. Provisional Patent Application No. 60/461,188 entitled "DATA OVER CABLE COMMUNICATION SYSTEM AND METHOD FOR RECOVERING DOWNSTREAM SYNCHRONIZATION AFTER INTERRUPTION OR LOSS OF DOWNSTREAM SIGNAL," filed Apr. 9, 2003. U.S. patent application Ser. No. 10/809,685 is hereby incorporated by reference for all purposes.

BACKGROUND OF THE INVENTION

1. Field of the Invention

The present invention generally relates to communication systems, and more specifically to maintaining synchronization in a communication system.

2. Background

In conventional cable modem systems, for example, a coaxial or hybrid fiber-coaxial (HFC) network provides a point-to-multipoint topology to support bidirectional data communication between a cable modem termination system (CMTS) at the cable headend and multiple cable modems at the customer premises. The communication path from the CMTS to the cable modems is typically referred to as the downstream, while the communication path from the cable modems to the CMTS is typically referred to as the upstream.

DOCSIS (Data Over Cable Service Interface Specification) refers to a group of specifications published by CableLabs® that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The current version of the DOCSIS specification is version 2.0, and includes the DOCSIS Radio Frequency Interface (RFI) Specification SP-RFIv2.0-I03-021218 (hereinafter "DOCSIS RFI Specification"), the entirety of which is incorporated by reference herein.

DOCSIS supports the ITU-T J.83 B (hereinafter "Annex B") standard for downstream physical (PHY) layer transmissions from the CMTS to cable modems. One difference between DOCSIS 2.0 and earlier versions of the standard is that DOCSIS 2.0 supports two different burst type formats for upstream PHY layer transmissions from the cable modems to the CMTS. In particular, as specified by the DOCSIS RFI Specification, the upstream physical media dependent (PMD) sublayer can use either an FDMA/TDMA burst type format, often referred to as the "TDMA mode," or an FDMA/TDMA/S-CDMA burst type format, often referred to as the "S-CDMA mode." The CMTS configures a cable modem to use either the S-CDMA mode or the TDMA mode through the transmission of DOCSIS media access control (MAC) messages.

The S-CDMA mode requires more precise synchronization than the TDMA mode. For example, a cable modem that uses S-CDMA generally requires synchronization within one or two nanoseconds to prevent interference with other S-CDMA modems transmitting information on the same upstream channel. On the other hand, a cable modem that uses TDMA typically requires synchronization within 250 nanoseconds. The precision of the synchronization required for S-CDMA is therefore approximately 100 or 200 times greater than that required for TDMA.

Regardless whether a cable modem is configured to use S-CDMA or TDMA, the timing of the upstream signal is generally based on timing information included in the downstream signal. Cable modems using earlier versions of the DOCSIS standard, such as DOCSIS 1.0 or DOCSIS 1.1, use timestamps provided in the downstream signal to synchronize the upstream and downstream signals. However, the heightened synchronization requirements of S-CDMA render timestamps insufficient for many cable modems using the DOCSIS 2.0 standard. Timestamps often do not occur with sufficient frequency to provide the additional 100 or 200 times greater precision in synchronization required in the S-CDMA. mode.

One proposed solution is for a CMTS transmitter to provide a symbol clock, or baud clock, within the downstream signal, which is then used by the cable modem to synchronize its upstream transmissions. However, if the transmitter fails or if the downstream signal is lost, the cable modem loses synchronization and all previously-received timing information is typically discarded. As a result, the cable modem typically resets and is required to execute a time-consuming re-ranging protocol with the CMTS in order to re-acquire synchronization.

What is needed, then, is a method and apparatus for maintaining synchronization in a communication system that addresses one or more of the aforementioned shortcomings of conventional communication system equipment and methods.

BRIEF SUMMARY OF THE INVENTION

The present invention provides an apparatus and method for maintaining synchronization in a communication system wherein a central entity transmits a signal containing timing information to one or more remote devices, the one or more remote devices using the timing information for scheduling transmissions. In an embodiment, the central entity includes a first transmitter, a second transmitter, and a synchronization element. The synchronization element synchronizes a first symbol clock and a second symbol clock. The first transmitter transmits a first signal to the one or more remote devices. The first signal includes first timing information based on the first symbol clock. The second transmitter transmits a second signal to the one or more remote devices in response to the first transmitter terminating transmission of the first signal. The second signal includes second timing information based on the second symbol clock.

In a further embodiment, the first signal further includes first data having a first forward error correction (FEC) alignment and the second signal further includes second data having a second FEC alignment, wherein the first FEC alignment is synchronized with the second FEC alignment. In a still further embodiment, at least one of the first transmitter and the second transmitter transmits calibration information relating to a difference between the first FEC alignment and the second FEC alignment to the one or more remote devices.

In another embodiment of the present invention, a remote device includes a receiver, a clock generation element, and an offset determination element. The receiver receives a first signal from a central entity. The clock generation element generates a symbol clock based on timing information included in the first signal and maintains the symbol clock upon termination of reception of the first signal. The receiver then receives a second signal from the central entity. The offset determination element determines a symbol clock offset between the first signal and the second signal using the maintained symbol clock. The upstream timing element adjusts the maintained symbol clock based on the symbol clock offset to provide an adjusted symbol clock.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Although the embodiments of the invention described herein refer specifically, and by way of example, to cable modem systems, including cable modem termination systems and cable modems, it will be readily apparent to persons skilled in the relevant art(s) that the invention is equally applicable to satellite systems, optical communications systems, telephone wire systems, home network systems, and/or any combination thereof, It will be readily apparent to persons skilled in the relevant art(s) that the invention is applicable to any point-to-multipoint system.

Figure 1:
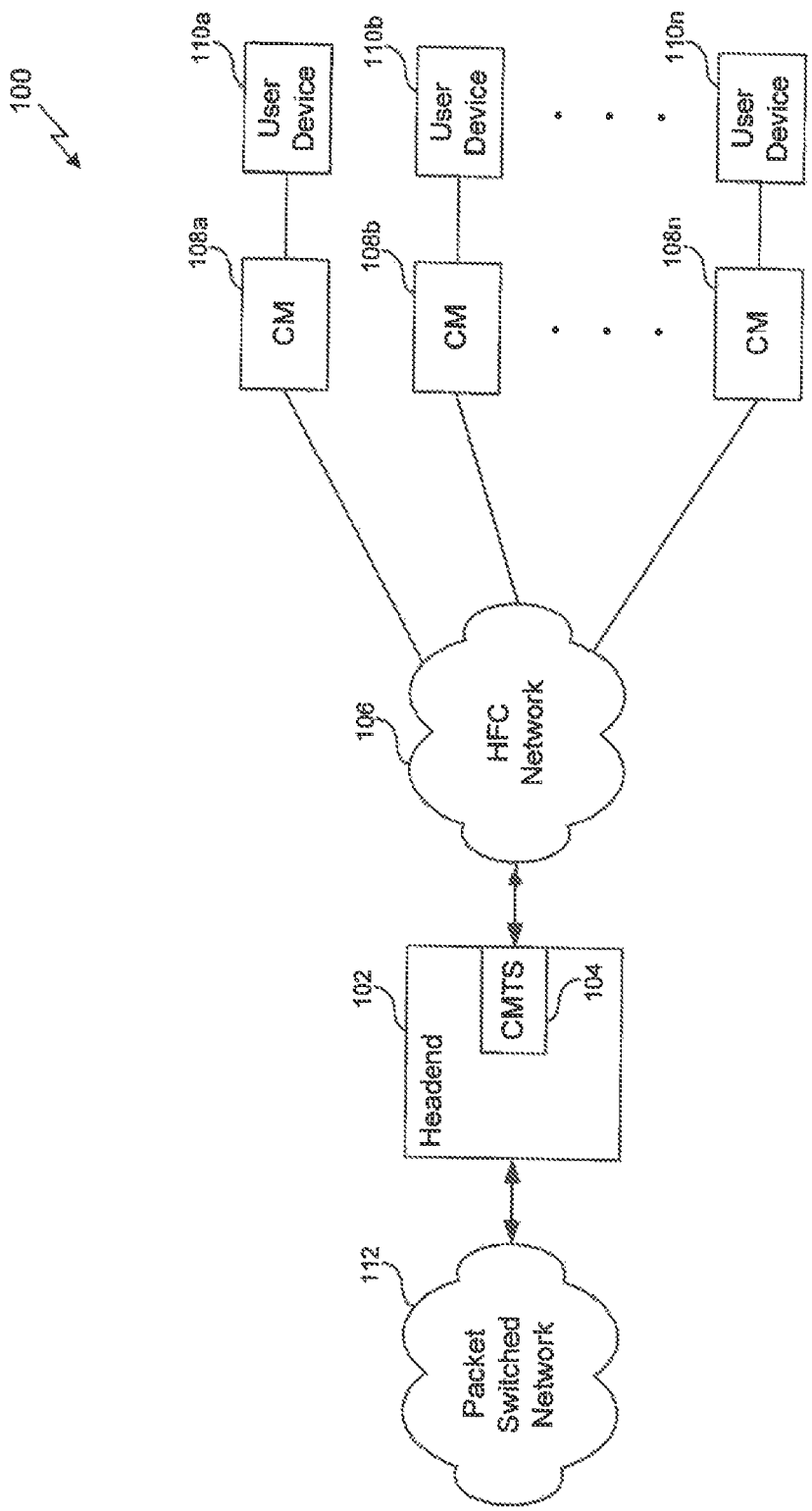
FIG. 1 illustrates a high-level block diagram of an example communication system according to an embodiment of the present invention.

FIG. 1 illustrates a high-level block diagram of an example communication system according to an embodiment of the present invention. The communication system 100 enables voice communications, video, and/or data services based on a bi-directional transfer of packet-based traffic, such as Internet Protocol (IP) traffic, between a cable system headend 102 and a plurality of cable modems 108a-108n via a communications network 106, which, by way of example, may comprise a hybrid fiber coaxial (HFC) cable network.

The cable headend 102 includes at least one cable modem termination system (CMTS) 104. The CMTS 104 is a portion of the cable headend 102 that manages the upstream and downstream transfer of data between the cable headend 102 and the cable modems 108a-108n, which may be located at respective customer premises. The CMTS 104 broadcasts information downstream to the cable modems 108a-108n as a continuous transmitted signal in accordance with a time division multiplexing (TDM) technique. Additionally, the CMTS 104 receives data from the cable modems 108a-108n over a plurality of shared upstream channels. Data from the cable modems 108a-108n is transmitted upstream in accordance with a time domain multiple access (TDMA) technique or a synchronous code division multiple access (S-CDMA) technique.

As shown in FIG. 1, the CMTS 104 further serves as an interface between the HFC network 106 and a packet switched network 112, transferring IP packets received from the cable modems 108a-108n to the packet switched network 112 and transferring IP packets received from the packet switched network 112 to the cable modems 108a-108n when appropriate. The packet switched network 112 may include the Internet.

In addition to the CMTS 104, the cable headend 102 may include one or more Internet routers to facilitate the connection between the CMTS 104 and the packet switched network 112, as well as one or more servers for performing necessary network management tasks.

The HFC network 106 provides a point to multipoint topology for the high speed, reliable, and secure transport of data between the cable headend 102 and the cable modems 108a-108n. As will be appreciated by persons skilled in the relevant art(s), the HFC network 106 may include coaxial cable, fiber optic cable, or a combination of coaxial cable and fiber optic cable linked via one or more fiber nodes, and may include frequency translation devices in support of a frequency stacking architecture, and may even include wireless links.

Each of the cable modems 108a-108n operates as an interface between the HFC network 106 and at least one attached user device 110. In particular, the cable modems 108a-108n convert downstream signals received over the HFC network 106 into IP data packets to be received by an attached user device 110. Additionally, the cable modems 108a-108n convert IP data packets received from the attached user device 110 into upstream burst signals suitable for transfer over the HFC network 106.

Referring to FIG. 1, each cable modem -108n is shown supporting only a single user device 110 for the sake of clarity. However, each cable modem 108a-108n is generally capable of supporting a plurality of user devices 110 for communication over the cable modem system 100. A user device 110 can be a personal computer, data terminal equipment, telephony device, broadband media player, network controlled appliance, or any other device capable of transmitting or receiving data over a packet switched network.

In an embodiment, cable modems 108a-108n and CMTS 104 represent DOCSIS-compliant cable modem equipment. In other words, cable modems 108a-108n and CMTS 104 may be adapted to communicate in accordance with protocols and/or formats provided in the DOCSIS specification.

Figure 2:
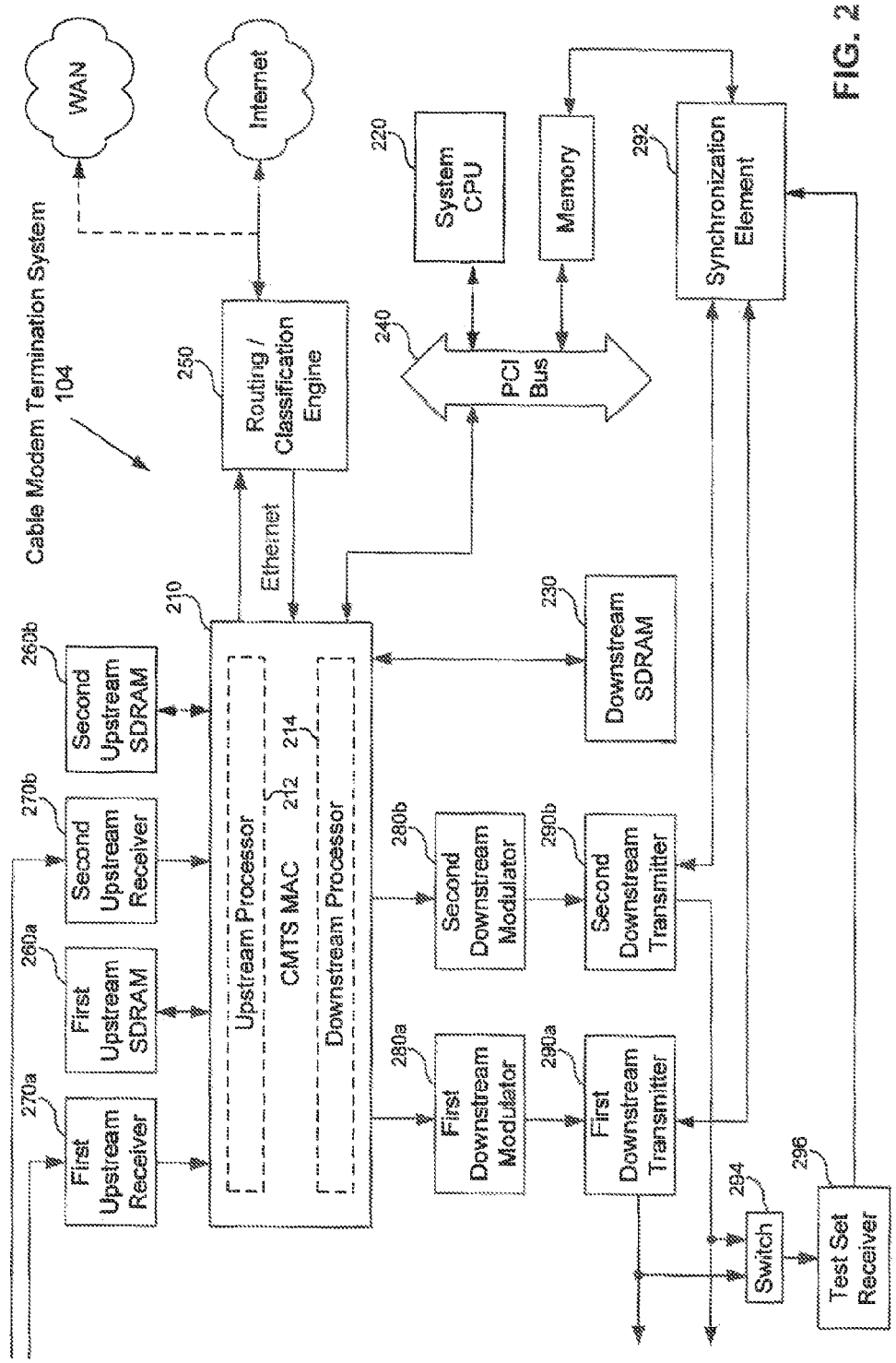
FIG. 2 illustrates a block diagram of an example cable modem termination system (CMTS) according to an embodiment of the present invention.

FIG. 2 illustrates a block diagram of an exemplary implementation of the CMTS 104 of the communication system 100. This exemplary implementation is presented by way of example, and is not intended to limit the scope of the present invention. The CMTS 104 processes signals both at a physical (PHY) layer and at a media access control (MAC) layer. The CMTS 104 includes a CMTS MAC 210. which provides hardware support for MAC layer per-packet functions, such as fragmentation, concatenation, and payload header suppression. Providing such support reduces the amount of processing required of a system central processing unit (CPU) 220, which serves to improve the overall performance of the CMTS 104.

An upstream processor 212 of the CMTS MAC 210 performs data encryption standard (DES) decryption, fragment reassembly, de-concatenation, payload packet expansion, packet acceleration, upstream management information base (MIB) statistic gathering, and/or priority queuing for the resultant packets. Each output queue is independently configured to output packets to a personal computer interface (PCI) or a gigabit media independent interface (GMII).

A downstream processor 214 of the CMTS MAC 210 accepts packets from priority queues and performs payload header suppression, DOCSIS header creation, DES encryption, cyclic redundancy checking (CRC), header check sequence creation in accordance with the DOCSIS specification, Moving Pictures Experts Group (MPEG) encapsulation, and/or multiplexing. In an embodiment, a downstream synchronous dynamic random access memory SDRAM 230 is used to support packaging, handling, and storage of output queues received from the CMTS MAC 210.

In an embodiment, the CMTS MAC 210 is configured and managed externally via a PCI interface and a PCI bus 240. Alternatively, the CMTS MAC 210 may be operated remotely using a routing classification engine 250 that is located externally to the CMTS MAC 210.

According to an embodiment, first and second upstream SDRAMs 260 are used to minimize latency on the internal buses. For example, in an embodiment, the first upstream SDRAM 260a is operable to support keys and reassembly, and the second upstream SDRAM 260b is operable to support PHS and output queues.

A Serial Peripheral Interface (SPI) master port is employed to control the interface between MAC layer components and PHY layer components. For example, the SPI master port can be used to control the interface between the CMTS MAC 210 and the first and second upstream receivers 270 and/or between the CMTS MAC 210 and the first and second downstream modulators 280.

The CMTS MAC 210 generates data which is modulated and then transmitted to one or more cable modems. For example, data generated by CMTS MAC 210 may be modulated onto a carrier signal by first downstream modulator 280a and then transmitted downstream by first downstream transmitter 290a. Likewise, data generated by CMTS MAC 210 may be modulated onto a carrier signal by second downstream modulator 280b and then transmitted downstream by second downstream transmitter 290b.

In accordance with an embodiment of the present invention, each downstream signal includes timing information that is based on a symbol clock of the CMTS. A cable modem that receives the downstream signal can rely on this timing information to facilitate synchronized upstream transmissions. This timing information can be lost, however, if the downstream signal is interrupted during its transmission to a cable modem or if a switchover occurs in which a different downstream transmitter is selected to transmit to the cable modem.

The embodiments described herein address the problem of maintaining upstream synchronization in a cable modem after loss of the downstream signal One issue of particular importance is maintaining upstream transmissions from the cable modem in an S-CDMA (or perhaps S-TDMA) mode that do not degrade performance of the communication system via poor upstream timing or a need for re-ranging. By providing novel functionality at the CMTS for synchronizing first and second downstream signals and/or by providing novel functionality at the cable modem for determining a symbol clock (or timing) offset between a first terminated downstream signal and a second re-acquired downstream signal, embodiments of the present invention facilitate maintenance of synchronization through the loss of the downstream signal, thereby Minimizing the need for re-ranging and avoiding poorly timed upstream bursts.

Resynchronization after loss of a downstream signal can be achieved independently or with reference to another downstream signal. For example, the signals transmitted by the first and second downstream transmitters 290 (i.e. the first and second downstream signals) can be synchronized at the symbol clock level, the forward error correction (FEC) level, and/or the MPEG level.

With respect to synchronization at the symbol clock level, the first and second downstream signals can include timing information based on first and second symbol clocks, respectively. A synchronization element 292 synchronizes the first and second symbol clocks. For instance, in an embodiment, the synchronization element 292 samples or reads the first and second downstream signals and synchronizes the signals based on synchronization instructions from the system CPU 220. This technique can provide synchronization to within a nanosecond or a sub-nanosecond in some embodiments.

At the FEC level, the first and second downstream signals can also include FEC alignment information, providing synchronization to within one downstream symbol clock cycle in some embodiments. At the MPEG level, synchronization can be achieved using MPEG headers in the downstream signals.

Synchronization of two downstream signals in the context of embodiments of the present invention can mean:

a) the two downstream signals are adjusted so that they are brought into precise alignment, or b) the misalignment between the two downstream signals is precisely measured and communicated to cable modems. The latter concept of synchronization is also referred to as "calibration". Calibration implies the use of signaling protocol and new cable modem functionality to read the calibration and to apply the calibration as a timing offset to the time derived from the second downstream signal for use in sending the upstream TDMA bursts, for example. By using the calibration method, however, it is not necessary to make some or all of the adjustments to align the two downstream signals at the CMTS.

Figure 3:
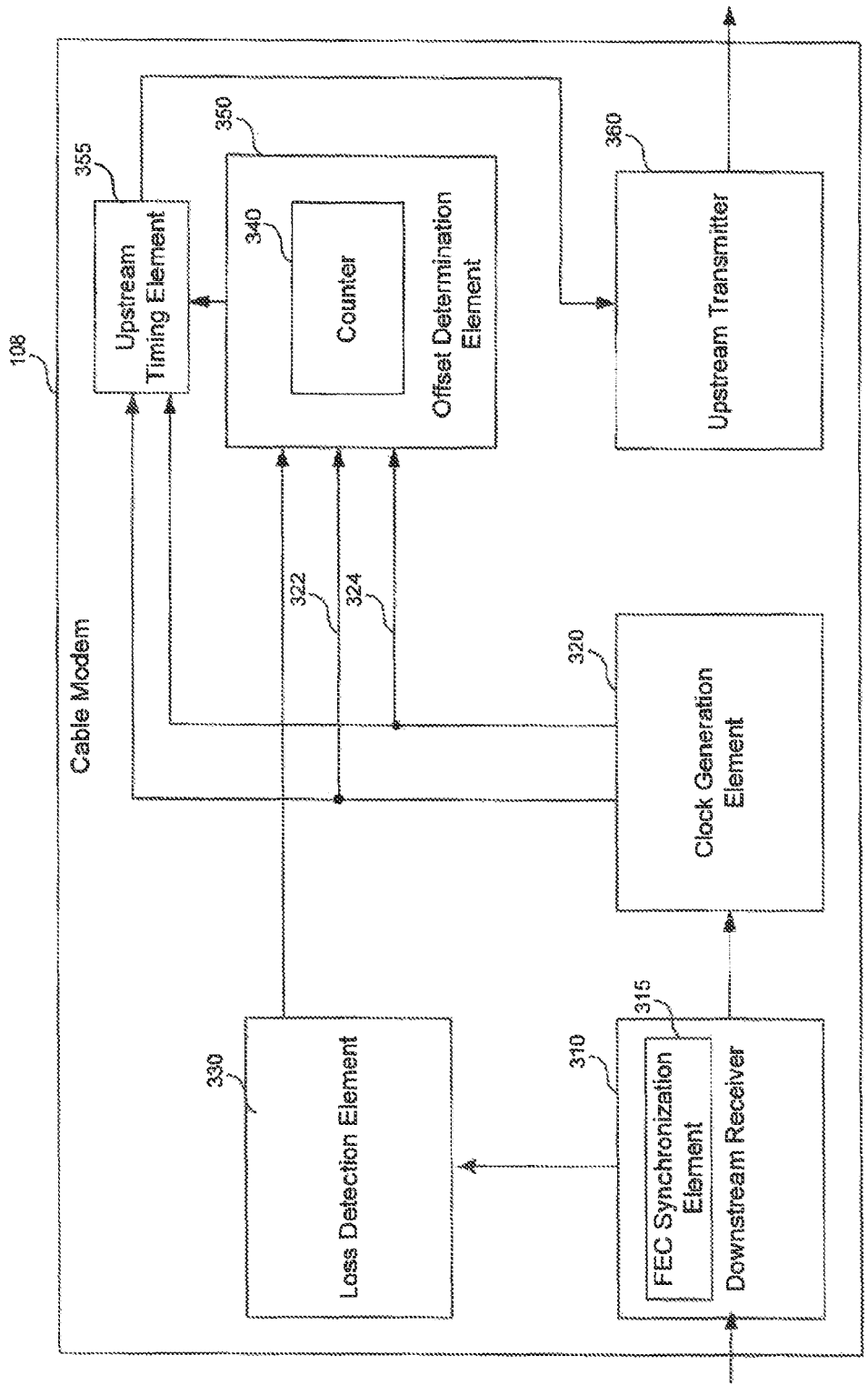
FIG. 3 illustrates a cable modem according to an embodiment of the present invention.

FIG. 3 illustrates an exemplary cable modem according to an embodiment of the present invention. The cable modem 108 includes at least one downstream receiver 310. The downstream receiver 310 receives a. first downstream signal from the CMTS 104. A clock generation element 320 generates a symbol clock based on first timing information included in the first downstream signal.

The first downstream signal may be lost during transmission to the cable modem 108. The loss detection element 330 detects the loss of the first downstream signal. The clock generation element 320 maintains the symbol clock in absence of the first timing information and provides this maintained symbol clock to the offset determination element 350 via clock line 322. Upon acquiring a healthy second downstream signal, the second clock is provided to the offset determination element 350 via clock line 324. The assignment of clock lines 322 and 324 to the first and second downstream signal clocks, respectively, is arbitrary.

In locking onto the second downstream signal, the downstream receiver 310 and the clock generation element 320 adjust the forward-predicted timing held over from the first downstream signal. The clock generation element 320 keeps the timing of the forward-predicted first downstream signal active, even as a copy of this timing is adjusted in acquiring the second downstream signal. Using clock lines 322 and 324, the offset determination element 350 is aware of the forward-predicted timing of the first downstream signal and of the adjusted timing achieved for acquiring the second downstream signal. A counter 340 captures the timing difference between the time forward-predicted from the (now lost) first downstream signal and the time derived from acquiring and tracking the second downstream signal. The forward-predicted, lost first downstream signal and the tracked second downstream signal are both continuously advancing in an embodiment. The counter 340 captures the difference between these two advancing times at least once. In an embodiment, the counter 340 is in the upstream timing element 355, though the scope of the present invention is not limited in this respect. For instance, the counter 340 can be in the offset determination element 350, as shown in FIG. 3, according to an embodiment.

A symbol clock offset, possibly a fraction of a symbol, may exist between the first downstream signal and the second downstream signal. In an embodiment, the clock generation element 320 might not perfectly forward-predict the timing of the (lost) first downstream signal after the first signal is lost, which can contribute to a greater offset between the forward-predicted first downstream signal timing and the tracked timing of the second downstream signal than actually exists between the two signals. The offset determination element 350 determines the symbol clock offset that exists in the cable modem 108 between the timing derived from the healthy second downstream signal and that which is forward-predicted, noisy or otherwise, from the lost first downstream signal An upstream timing element 355 uses the symbol clock offset to adjust the maintained symbol clock driving the upstream transmitter timing, which has thus far followed the forward-predicted timing from the lost first downstream signal. For example, the upstream timing element 355 generally adjusts the maintained symbol clock by an amount equal to the symbol clock offset. The upstream transmitter timing is switched to update from the second downstream signal timing at approximately the same time the symbol clock offset between the forward-predicted first downstream signal and the tracked second downstream signal is measured and applied. In this step, the handoff is completed for transitioning the upstream timing to follow the second downstream signal, the updates for the upstream signal timing are delivered from the tracked timing of the second downstream signal, and the timing offset of the second downstream signal is adjusted to correct for the difference between the forward-predicted timing of the lost first downstream signal and the second downstream signal.

Loss of the first downstream signal can occur due to a switchover from a first transmitter 290a to a second transmitter 290b at the CMTS 104. In an embodiment, as part of the switchover process, the CMTS 104 provides an advance notification message to the cable modem 108 indicating that the first downstream signal will be terminated and that the second downstream signal will subsequently be applied. This permits the cable modem 108 to enable features relating to maintaining synchronization in advance of the loss of the first downstream signal.

According to a further embodiment, the downstream receiver 310 receives calibration information from the CMTS 104 relating to a difference in forward error correction (FEC) alignment between the first downstream signal and the second downstream signal before the downstream receiver 310 receives the second downstream signal. In an embodiment, the downstream receiver 310 includes an FEC synchronization element 315, which can provide information to the clock generation element 320 regarding the difference in FEC alignment. For example, the offset determined by the offset determination element 350 can be based, at least in part, on the difference in FEC alignment between the first and second downstream signals.

FEC can be employed using a Trellis Coded Modulation (TCM) technique and/or a Reed-Solomon encoding technique. For example, the first and second downstream signals can each be encoded in accordance with a TCM technique and/or a Reed-Solomon encoding technique. At the CMTS, two TCM encoded signals can be synchronized based on the puncture alignment of the signals, and two Reed-Solomon encoded signals can be synchronized based on the frame alignment of the signals. In an embodiment, the offset determined by the offset determination element 350 is based on an offset necessary to obtain a valid puncture alignment for TCM decoding and/or a valid frame alignment for Reed-Solomon decoding of the information in the second downstream signal. The offset necessary to obtain a valid puncture alignment and the offset necessary to obtain the valid frame alignment can be determined independently by the offset determination element 350.

In an embodiment, the upstream timing element 355 adjusts the maintained symbol clock based on the offset to provide an adjusted symbol clock to the upstream transmitter 360. The upstream transmitter 360 utilizes the adjusted symbol clock to synchronize upstream transmissions to the CMTS 104.

Figure 4A:
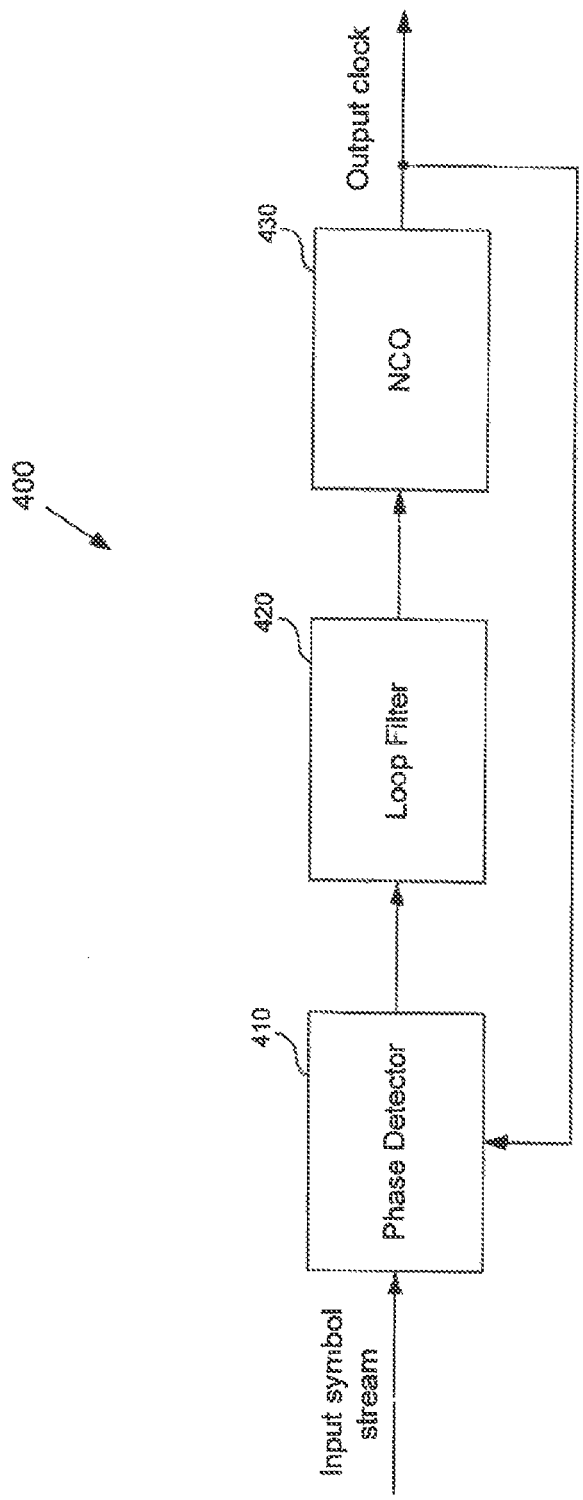
FIG. 4A illustrates a phase locked loop (PLL) according to an embodiment of the present invention.
Figure 4B:
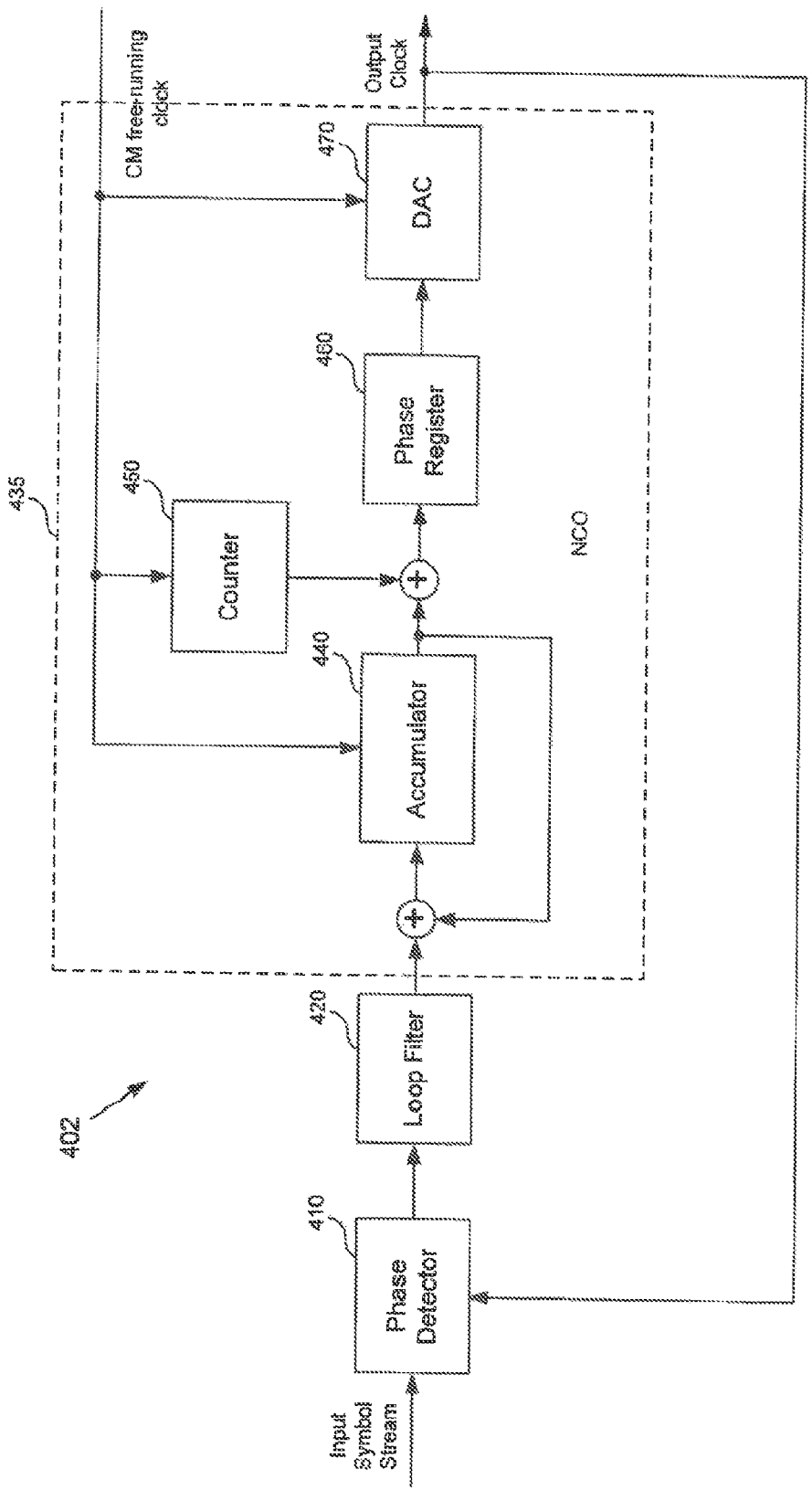
FIG. 4B illustrates a phase locked loop (PLL) according to an embodiment of the present invention.
Figure 4C:
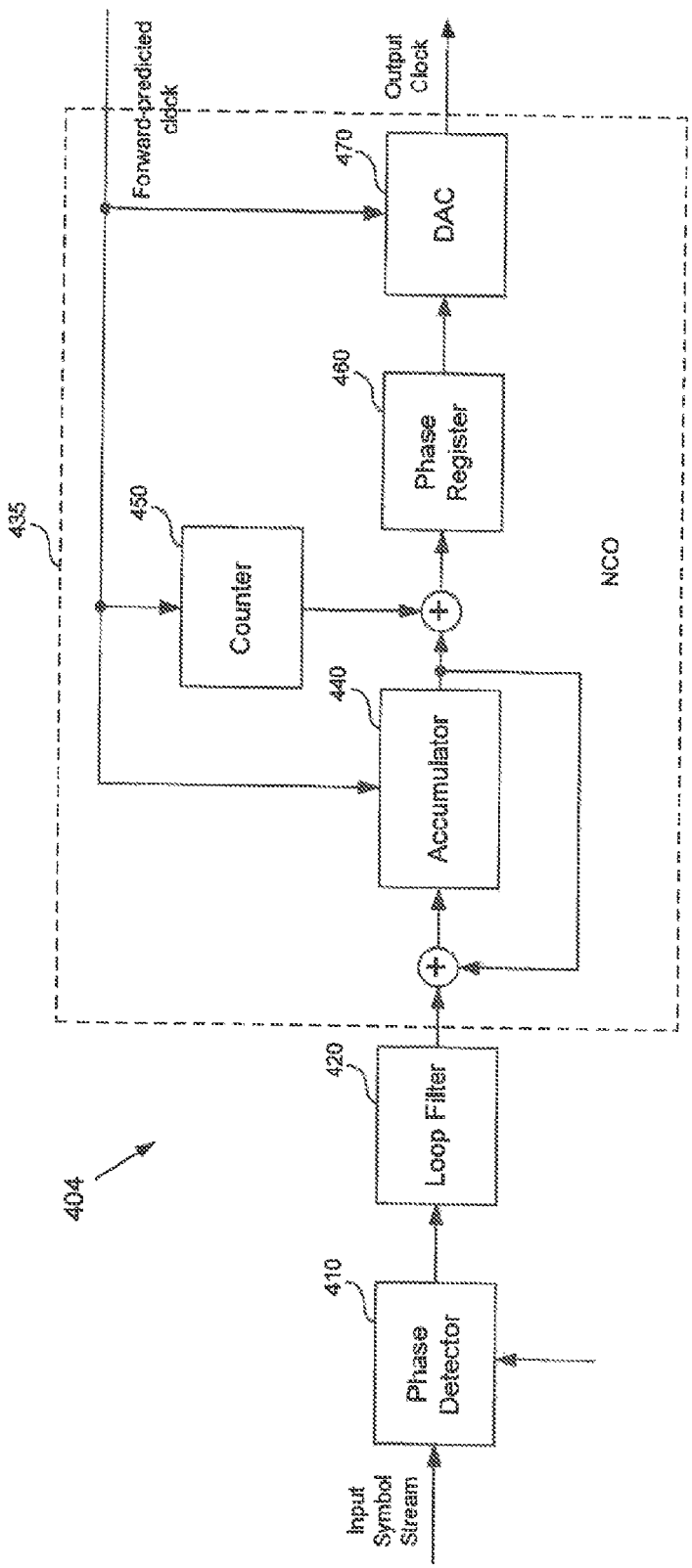
FIG. 4C illustrates a phase locked loop (PLL) according to an embodiment of the present invention.

Successful upstream synchronization is often dependent upon proper downstream synchronization. FIGS. 4A-4C provide more detail as to how downstream synchronization can be achieved according to embodiments of the present invention. FIG. 4A illustrates a phase-locked loop (PLL) having a phase detector 410, a loop filter 420, and a numerically controlled oscillator (NCO) 430. The PLL 400 can be used to synchronize an output clock with an input symbol stream. For example, the input symbol stream can be sampled once per symbol, twice per symbol, etc. The phase detector 410 receives the input symbol stream and provides a signal based on the frequency or phase of the input symbol stream to the loop filter 420. The loop filter 420 smoothes out the signal received from the phase detector 410 to maintain lock in the PLL 400. The NCO 430 provides an output clock based on the signal received from the loop filter 420.

FIG. 4B illustrates a PLL having an NCO 435 that numerically generates the phase of the output clock based on the cable modem free-running clock. The output clock is converted into an analog clock waveform by a digital-to-analog converter (DAC) 470. DAC 470 generally converts one bit position of a phase word input received from the phase register 460 to a positive drive voltage (for "1" in the key bit position) or a negative (for "0" in the key bit position) drive voltage to provide a square wave clock. Bit positions of lower significance than the key bit position in the phase word represent phase increments smaller than 360 degrees, while bit positions of higher significance represent an integer number of symbols. Variations (e.g., drive voltage amplitude, polarity, bias, and/or filtering), and more complicated embodiments, can be envisioned and are practiced, and apply equally well to embodiments of the present invention. In FIG. 4B, the output clock phase includes the contribution from the CM free running clock and a contribution derived from the loop filter control signal input to the NCO 435. The control signal input to the NCO 435 is accumulated by the accumulator 440 and is the "correction" or phase adjustment that is applied to the CM free running clock to bring the output clock into synchronization with the input symbol stream.

Referring to FIG. 4C, the NCO 435 can be clocked by the forward-predicted clock derived from the (now lost) first downstream signal, rather than by the CM free running clock as described above with respect to FIG. 4B. The accumulator 440 in FIG. 4C provides the "correction" or phase required to bring the forward-predicted clock from the first downstream signal into synchronization with the second applied downstream symbol stream. In an embodiment, functions such as those described with respect to FIGS. 4B and 4C can be performed in the clock generation element 320 and/or the offset determination element 350. For example, in an embodiment, the offset determination element 350 can duplicate functions performed by the clock generation element 320 to the extent that an accumulator 440 value is produced. The accumulator value is the possibly ever-changing offset required to shift the forward-predicted first downstream timing into synchronization with the second downstream timing, except for possibly a timing offset corresponding to an integer number of downstream symbols. If the offset is less than ½ symbol in magnitude, then the accumulator value can be applied generally after a modulo operation limiting the range to one cycle or +/−180 degrees of phase. If the offset is more than ½ symbol in magnitude, then further refinement of the true timing offset can be obtained, using the FEC puncture alignment and synchronization bits embedded in the data.

According to an embodiment, FEC alignment in the newly re-established data stream can be attempted using the offset provided by the accumulator 440, provided that (1) the symbol counts in the FEC processing circuits are maintained during the lost-signal period based on the forward-predicted clock and (2) the second downstream signal is acquired. In an embodiment, an offset of multiple downstream symbols can be resolved by noting how many downstream symbols the FEC clocking has to be adjusted to bring the timing derived from the forward-predicted clock into alignment with the FEC in this re-established downstream.

The forward-predicted timing from the first (now lost) downstream may be facilitated by using processing such as that described with respect to FIG. 4B, according to an embodiment. The outputs of the loop filter 420 and the NCO 435 can be stored, with delay, where the delay corresponds to several loop response time constants. In this manner, once a "loss of lock" is detected for the loop, older, healthy values of the parameters needed for re-establishing the downstream synchronization are still available. These healthy parameters are used to predict the downstream timing. For example, the phase of the clock can be predicted in an embodiment using the estimated frequency difference between the input symbol stream and the CM free running clock.

Methods and considerations for maintaining synchronization in the communication system 100, in which a first downstream signal is lost and a second downstream signal is subsequently acquired, are discussed in detail below.

1.0 Situation #1: One Transmitter with Interruption

The primary consideration in handling an interruption of the downstream signal is the ability of the clock recovery loop in the cable modem to "fly wheel" (i.e., maintain the clock signal) with sufficiently accurate frequency, so that a "direct pull-in" (i.e., reacquisition of the downstream signal without a cycle slip occurring) is performed. A cycle slip occurs when the downstream signal is reacquired and locked to a different cycle of the clock than the cycle to which it was locked before the interruption.

Some considerations for achieving a direct pull-in are: (1) the accuracy with which the clock generation element 320 is able to maintain the symbol clock; (2) the sensitivity of the loss detection element 330; (3) whether the cable modem 108 enters a search mode upon loss and reacquisition of the downstream signal, which can cause any information regarding the maintained symbol clock to be lost; and (4) whether low signal levels, low signal-to-noise ratio (SNR), or echo in the channel significantly impact performance of the cable modem 108. For example, a cable modem 108 in accordance with an embodiment of the present invention is capable of operating in spite of low signal levels and echo in the channel. In an embodiment, the cable modem 108 is capable of re-acquiring a healthy downstream signal after a 100 ms interruption without a cycle slip. According to an embodiment, if a cycle slip occurs, the cycle slip is no more than one or two cycles. With respect to a symbol clock, one cycle generally relates to one symbol. Thus, in accordance with an embodiment of the present invention, the cycle slip is no more than one or two symbols of the downstream symbol clock.

Even with a cycle slip of a few downstream symbols, FEC can be used to maintain synchronization through a downstream signal interruption. For example, if the downstream signal is received from a single downstream transmitter 290 of the CMTS 104, and there is an interruption, then the recovered symbol clock timing will be accurate to within a multiple of downstream symbol periods. However, the ITU-T J.83 B (i.e. Annex B) FEC is traditionally intolerant to the loss or insertion of a downstream symbol. If the clock generation element 320 of the cable modem 108 continues to count symbols using the maintained symbol clock and a cycle slip occurs, re-application of a healthy Annex B signal can produce an FEC failure.

A downstream signal can be encoded using a quadrature amplitude modulation (QAM) technique. Information in a QAM signal is transmitted in "blocks" of QAM symbols, where each QAM symbol includes n bits of data. A QAM modulation technique in which n bits of data are included in each symbol is generally referred to as $2^n$QAM. In Annex B, 64QAM and 256QAM signals, for example, can utilize blocks of five symbols each, so that 30 bits and 40 bits are transmitted per block, respectively. In this example, a TCM decoder typically outputs 28 bits and 38 bits, respectively, for these blocks of five QAM symbols. The use of 64QAM and 256QAM signals in the previous example is for illustrative purposes only, and the scope of the present invention is not limited in this respect. Embodiments of the present invention can utilize any modulation format.

Upon initial acquisition of the downstream signal, a cable modem 108 performs an alignment search to determine the puncture alignment of the TCM convolution code. In an embodiment, multiple techniques are used to test for proper puncture alignment. For example, the downstream signal can be grouped into blocks of five symbols each, beginning with a particular symbol. Output of the TCM decoder of the cable modem 108 can be monitored to determine whether it is producing valid output. If the TCM decoder is not producing valid output, the symbols can be regrouped, beginning with the next successive symbol, for example. The output of the TCM decoder can be monitored again, and this process of regrouping can continue until the TCM decoder is producing valid output, at which point the downstream signal will be aligned. This is merely one example by which a valid puncture alignment can be achieved. A variety of algorithms can be employed to provide rapid and accurate acquisition and maintenance of the puncture alignment.

In accordance with an embodiment of the present invention, puncture alignment is maintained despite the loss of the downstream signal, and a search for a new puncture alignment is not performed in order to prevent a loss of timing information associated with the maintained symbol clock. The TCM decoder can recognize a cycle slip that is not a multiple of the number of symbols in each block of the downstream signal. For example, if the downstream signal includes blocks of five QAM symbols each, the TCM decoder can recognize an improper puncture alignment so long as the cycle slip is not a multiple of five QAM symbols. In an embodiment, the TCM decoder recognizes a cycle slip of one or two symbols.

The unique word portion of a frame sync trailer can be used to determine a cycle slip of more than two QAM symbols. "Sync trailer" refers to the extra 40 or 42 bits that define an FEC frame in Annex B. There is no comparable structure in ITU-T J.83 Annex A ("Annex A"). Once the proper TCM puncture alignment is achieved, either the correct timing has been recovered, or a multiple of five QAM symbols has been inserted or deleted. In an embodiment, this results in a disparity of a multiple of 28 bits (for 64 QAM) or 38 bits (for 256 QAM) in locating the unique word after decoding the inner TCM FEC. In an embodiment, achieving a valid puncture alignment and locating the unique word in the frame sync trailer can lead to clock recovery for cycle slips of thousands of QAM symbols.

According to an embodiment of the present invention, a second downstream transmitter 290*b* can be brought into FEC alignment with the first downstream transmitter 290*a*. In Annex B, an FEC frame of a 256QAM signal generally includes 10,380 QAM symbols. An FEC frame of a 64QAM signal generally includes 9,607.5 QAM symbols. The FEC frames are approximately 1.9 ms in an embodiment. As long as the downstream transmitters 290 that are switched have been synchronized for downstream symbol clock and FEC alignment, the number of cycle slips that have occurred upon reacquisition can be determined using a combination of the clock recovery loop and the FEC frame unique word. In an embodiment, the original timing can be restored for cycle slips of approximately one millisecond. This PHY layer capability does not depend on data content.

A transmission mode in which the frame sync header is augmented or shortened from the Annex B standard can be used to synchronize the downstream signal. For instance, the downstream transmitter 290 can make changes in its FEC alignment based on the augmented frame sync header. Knowledgeable downstream receivers 310 can step along with the transmission. In embodiments of the present invention, considerations such as briefly losing the downstream symbol clock completely and attempting to re-acquire the downstream symbol clock with minimal disturbance upon reapplication of the downstream signal can be taken into consideration when designing and implementing the acquisition, reacquisition, search, lock detect, and loss of lock indicators and algorithms of the communication system 100.

2.0 Situation #2: Two Transmitters with Interruption

Figure 5:
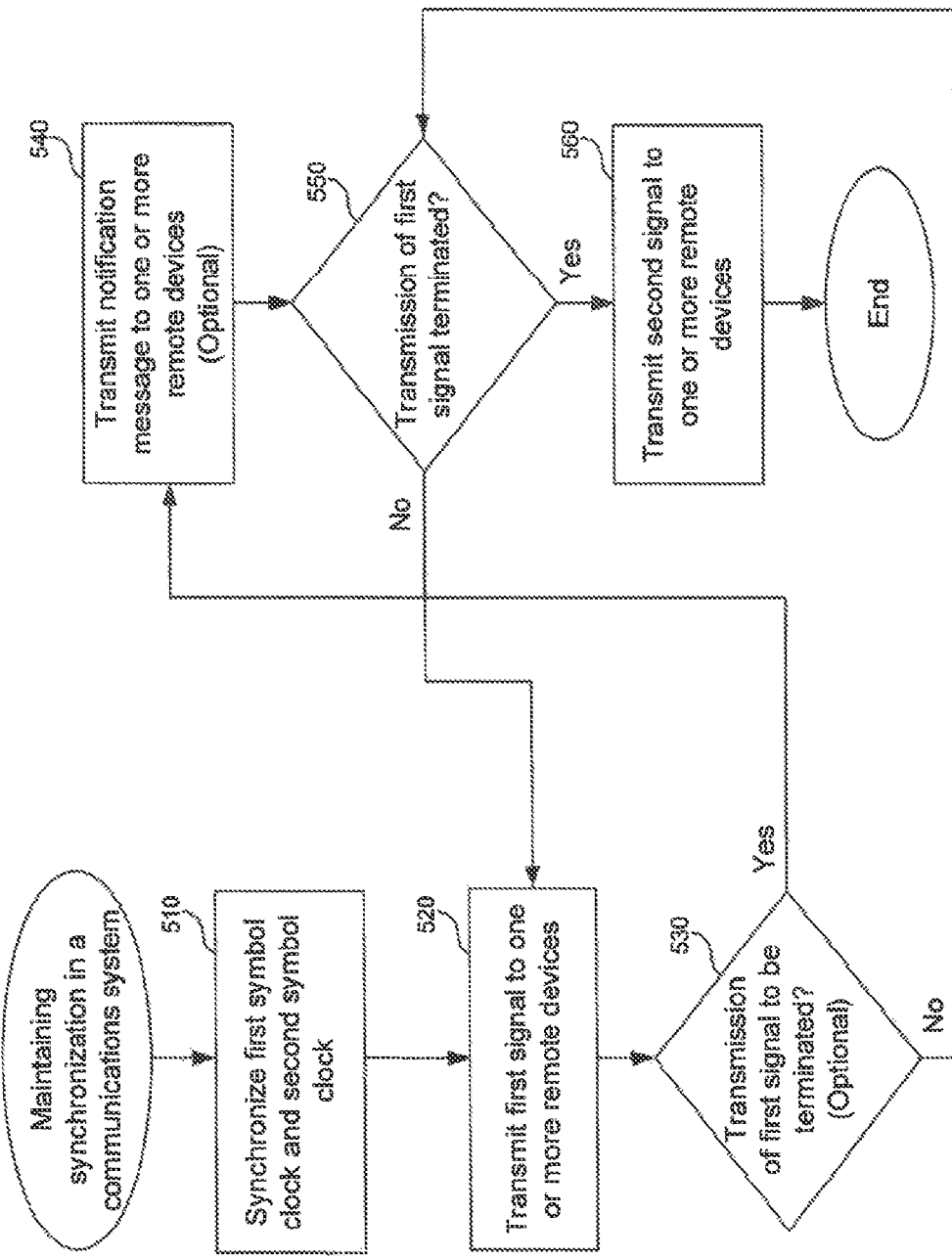
FIG. 5 illustrates a flow chart of a first method for maintaining synchronization in a communication system according to an embodiment of the present invention.

FIG. 5 illustrates a flow chart of a method for maintaining synchronization in a communication system according to an embodiment of the present invention. For instance, synchronization can be maintained in a communication system 100 using two downstream transmitters 290 at the CMTS 104. In FIG. 5, a first symbol clock and a second symbol clock are synchronized at block 510. The first and second symbol clocks are used to generate timing information that is included in the first and second downstream signals transmitted by the first and second downstream transmitters 290, respectively.

The first downstream transmitter 290*a* transmits the first downstream signal at block 520 to a remote device, such as a cable modem 108. If the transmission of the first downstream signal is going to be terminated, as determined at decision block 530, then a notification message can be sent at block 540 to the remote device. In an embodiment, the cable modem 108 can prepare for termination of the first downstream signal upon receipt of the notification. For instance, the cable modem 108 can determine a delay that will occur during the switchover from the first downstream transmitter 290*a* to the second downstream transmitter 290*b*. If the transmission of the first downstream signal is, in fact, terminated, as determined at decision block 550, the second downstream signal is transmitted at block 560 to the cable modem 108. If the transmission of the first downstream signal is not terminated, however, the first downstream signal continues to be transmitted to the cable modem 108 as shown at block 520.

Figure 6:
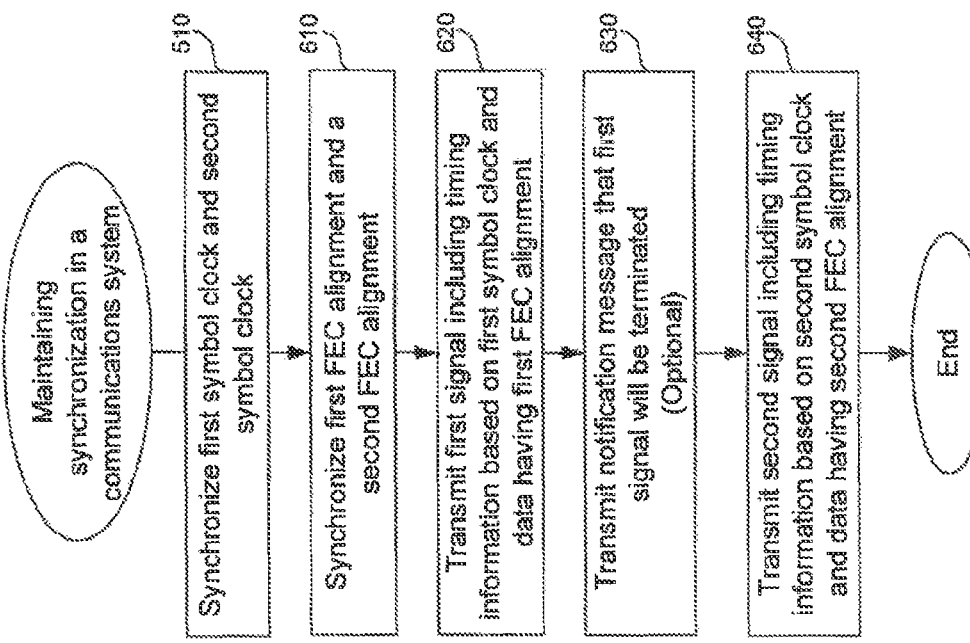
FIG. 6 illustrates a flow chart of a second method for maintaining synchronization in a communication system according to an embodiment of the present invention.

Referring to FIG. 6, the first downstream signal can further include data having a first FEC alignment, and the second downstream signal can further include data having a second FEC alignment. The first FEC alignment and the second FEC alignment are synchronized at block 610. For example, the CMTS 104 synchronizes the first and second FEC alignments. The first downstream signal including the timing information based on the first symbol clock and the data having the first FEC alignment is transmitted at block 620 to the cable modem 108. A notification message can be sent at block 630, informing the cable modem 108 that the first downstream signal is going to be terminated. In response to the first downstream signal being terminated, the second downstream signal including the timing information based on the second symbol clock and the data having the second FEC alignment is transmitted at block 640 to the cable modem 108.

Figure 7:
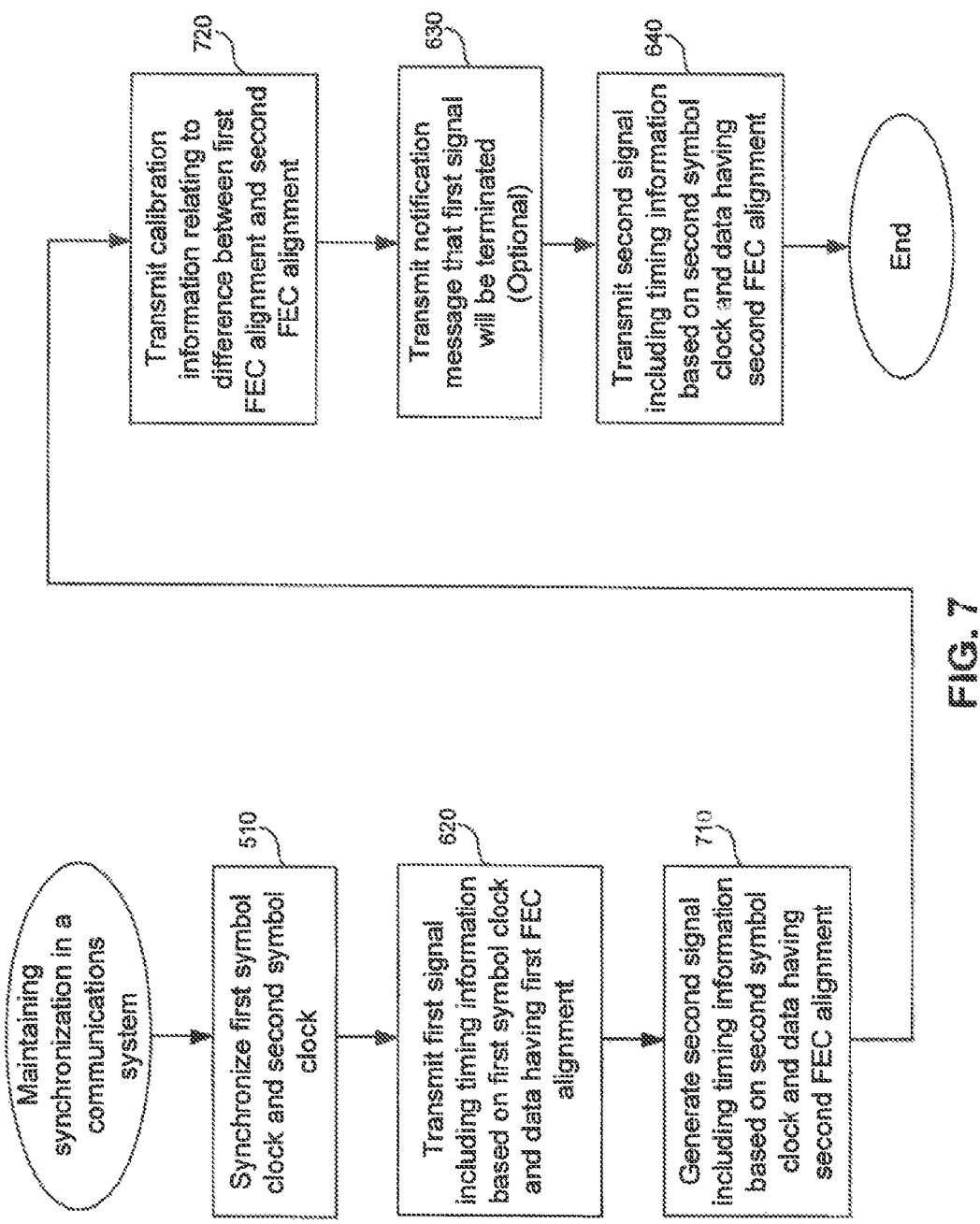
FIG. 7 illustrates a flow chart of a third method for maintaining synchronization in a communication system according to an embodiment of the present invention.

In accordance with an embodiment of the present invention, the first FEC alignment and the second FEC alignment are not synchronized by the CMTS 104. Instead of synchronizing the first and second FEC alignments, the CMTS 104 determines a difference between the first and second FEC alignments and provides that information to the cable modem 108. Referring to FIG. 7, the second downstream signal including the timing information based on the second symbol clock and the data having the second FEC alignment is generated at block 710. Calibration information relating to the difference between the first FEC alignment and the second FEC alignment is transmitted at block 720 to the cable modem 108.

According to an embodiment, the calibration information is generated by comparing the first FEC alignment to the second FEC alignment. In an alternate embodiment, the calibration information includes first calibration data and second calibration data. The first calibration data is generated by comparing the first FEC alignment to a reference alignment, and the second calibration data is generated by comparing the second FEC alignment to the reference alignment. In an embodiment, the cable modem 108 uses the calibration information to determine a symbol clock offset between first and second downstream signals.

Figure 8:
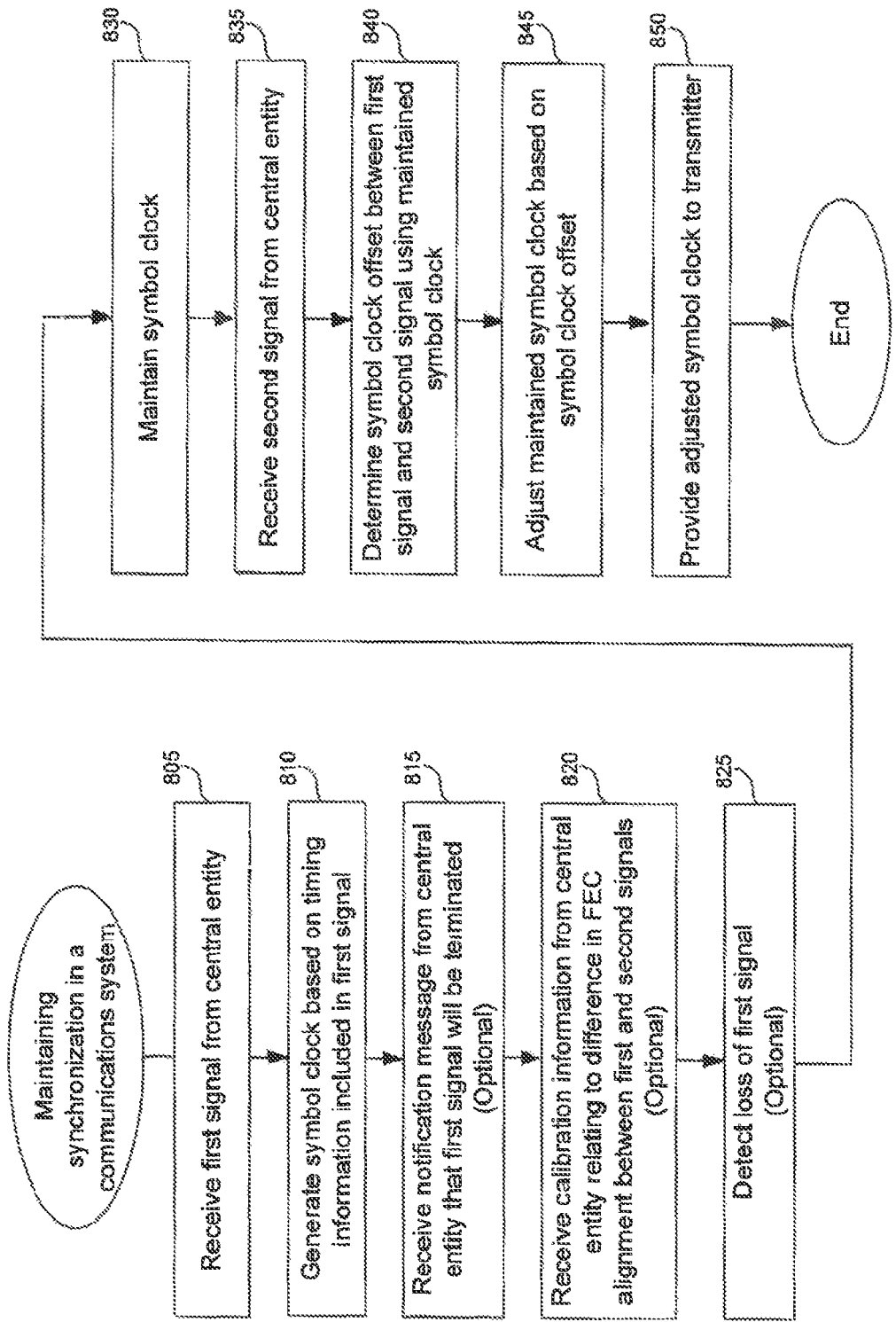
FIG. 8 illustrates a flow chart of a fourth method for maintaining synchronization in a communication system according to an embodiment of the present invention.

Referring to FIG. 8, the first downstream signal is received at block 805 from a central entity, such as the CMTS 104. For example, the first downstream signal is received from a first downstream transmitter 290a of the CMTS 104. A symbol clock is generated based on timing information included in the first downstream signal at block 810. In an embodiment, a notification message is received from the CMTS 104 at block 815, indicating that the first downstream signal is going to be terminated. A second downstream signal can be generated at the CMTS 104. For example, the first and second downstream signals can be synchronized in some respect. Calibration information can be received from the CMTS 104 at block 820, wherein the calibration information relates to the difference in FEC alignment between the first and second downstream signals. In an embodiment, the loss of the first downstream signal is detected at block 825 prior to receiving the second downstream signal. The symbol clock is maintained at block 830 in absence of the timing information included in the first downstream signal.

A second downstream signal is received at block 835 from the CMTS 104. In an embodiment, the second downstream signal is received from a second downstream transmitter 290b of the CMTS 104, though the scope of the present invention is not limited in this respect. For instance, the second downstream signal can be received from the same downstream transmitter from which the first downstream signal is received.

A symbol clock offset between the first downstream signal and the second downstream signal is determined at block 840 using the maintained symbol clock. For instance, the difference in FEC alignment between the first and second downstream signals can be taken into account to determine the symbol clock offset. In an embodiment, a counter is incremented during the time period between the loss of the first downstream signal and receipt of the second downstream signal. For example, the counter can be incremented at successive cycles of the maintained symbol clock to determine the symbol clock offset.

Determining the symbol clock offset is performed in response to receiving the notification message and/or receiving the second downstream signal. In an embodiment, determining the symbol clock offset includes identifying a symbol clock offset necessary to obtain a valid puncture alignment for decoding data in the second downstream signal, where the data is encoded in accordance with a TCM technique and where TCM decoding is performed using the maintained symbol clock. In another embodiment, determining the symbol clock offset includes identifying a symbol clock offset necessary to obtain a valid frame alignment for decoding data in the second downstream signal, where the data is encoded in accordance with a Reed-Solomon encoding technique and where Reed-Solomon decoding is performed using the maintained symbol clock. In a further embodiment, the symbol clock offset necessary to obtain the valid puncture alignment and the symbol clock offset necessary to obtain the valid frame alignment are combined to generate a combined symbol clock offset.

At block 845, the maintained symbol clock is adjusted based on the symbol clock offset. At block 850, the adjusted symbol clock is provided to an upstream transmitter 360 which uses the adjusted second symbol clock to synchronize upstream transmissions to the CMTS 104.

In an embodiment, data transmitted by the downstream transmitters 290 is not aligned, though the symbol clock timing and the FEC alignment is synchronized between the transmitters 290. For example, the downstream transmitters 290 can transmit MPEG packets that are not aligned with each other. In some embodiments, the contents of the packets can differ, with differences of insertion of null packets occurring in some embodiments.

In an embodiment, the FEC portion of the PHY layer is not aligned. In some embodiments, alignment of the FEC portion can occur if the first and second downstream transmitters 290 lock their symbol clocks to the same input reference clock, and the symbol clocks are aligned in a fine timing sense. For example, a crude cable trimming technique can be used to provide fairly fine alignment. In an embodiment, a programmable delay device can align the symbol clocks. It might be necessary to break and reacquire the input reference signal of the second transmitter 209b multiple times to compensate for ambiguity in the synthesis of the downstream symbol clock from the input reference according to some embodiments.

If this method is applied at the CMTS 104, then the use of FEC frame alignment is generally not available to mitigate cycle slips in the symbol clock recovery loop of the cable modem 108 after the switch to the second downstream transmitter 290b. In an embodiment, the difference in FEC alignment between the two downstream transmitters 290 can be learned while both are operating, and the difference can be included in the downstream signaling before or after the switch to the second downstream transmitter 290b. If the cable modem 108 is provided this information via downstream command signaling, then it can adjust for cycle slips as discussed above by adding another integer number of QAM symbol intervals to the alignment of the upstream timing.

3.0 Aligning Symbol Clock Timing and FEC Framing of Two Downstream Transmitters

One consideration that arises with respect to switching from the first downstream transmitter 290a to the second downstream transmitter 290b of the CMTS 104 is the ability of the downstream receiver 310 of the cable modem 108 to reconstruct the timing of the first downstream transmitter 290a with sufficient accuracy to allow upstream S-CDMA bursts without re-ranging.

Strict alignment of the FEC framing is generally not required for downstream signals having synchronized FEC puncture alignment. Instead, simple calibration is sufficient, provided the calibration between the downstream transmitters 290 is made known to the cable modem 108 within a short time after interruption/switchover. The combination of (1) counting the number of QAM symbols to bring about FEC alignment at the cable modem 108 and (2) the knowledge of the calibrated difference between FEC alignments of the first and second downstream transmitters 290 provides information sufficient to determine the number of cycle slips the cable modem 108 endures in locking to the second downstream transmitter 290b.

Other considerations regarding switching downstream transmitters 290 include (1) how to align the two downstream symbol clocks and (2) how to calibrate the offset in FEC framing alignment. According to an embodiment, the FEC alignment of all downstream transmitters 290 is calibrated based on a single downstream transmitter 290, such as the first downstream transmitter 290a. For example, the calibration of the first downstream transmitter 290a can be conveyed in the downstream signaling. Any downstream receiver 310 is typically able to store the calibration of the first downstream transmitter 290a. For instance, computing the difference between the FEC framing alignment of the second downstream transmitter 290b and the calibration of the first downstream transmitter 290a can provide sufficient FEC alignment information to determine the number of cycle slips. According to some embodiments, providing this calibration information in all transmissions mitigates the need for special transmissions at switchovers.

The same reference clock is generally provided to all downstream transmitters 290 for synthesizing their downstream symbol clocks, with a small differential delay in the distribution of the reference clock to each downstream transmitter 290. Similarly, there is a common point at which the downstream signals are available at a switch 294, which selects one of the downstream signals for a Test Set Receiver (TSR) 296, as shown in FIG. 2. This same common point also exists for the distribution of the transmitter outputs to the downstream network. In other words, alignment for the downstream symbol clock phases and calibration of the FEC alignment can both be achieved at this common point.

4.0 Aligning Symbol Clock Phases of Two Downstream Transmitters

It is assumed that each downstream transmitter 290 is fed with a common reference clock for synthesizing their downstream symbol clocks. The reference clock can be the Master Clock or a harmonic thereof, to provide some examples.

The transmitter loop for synthesizing the downstream symbol clock can be augmented to provide two versions of its output. The first version is the same as the output already in place. The second version is a phase-shifted version of the original output that is fed back for locking to the input reference clock. The second version of the downstream symbol clock is the actual symbol clock used in the transmitter 290. This second output is generated by taking the original output from a numerically controlled oscillator (NCO), for example, and adding it with the contents of a synchronizing phase shifter register.

The output of the synchronizing phase shift register is provided to the downstream transmitter 290 via a command bus, for example, and is generated in a calibration step. Precaution can be used to avoid making rapid, large phase step adjustments in this second version of the clock. "Slewing in" to the ultimate phase shift adjustment occurs in accordance with an embodiment of the present invention. Maintaining transmission integrity during a phase shift in the downstream symbol clock is generally not required.

To determine the phase shift adjustment required for the second downstream transmitter 290b to be aligned to the first downstream transmitter 290a, the Annex B transmission of the first downstream transmitter 290a is provided to the TSR 296 to perform downstream symbol clock recovery. The input to the TSR 296 can be switched to accept the transmission of the second downstream transmitter 290b, with a brief period of no input to the downstream receiver 310. For example, the period of no input can be approximately one millisecond.

The TSR 296 can be designed to detect the loss of an input signal and to enable the operation of a second, parallel NCO in its downstream symbol clock recovery circuit. According to an embodiment, the second NCO fly wheels to precisely mimic the primary NCO during the loss of the downstream signal. Upon reapplication of the downstream signal to the TSR 296, the primary NCO generally operates within the loop as "normal", The second NCO can continue to operate in the fly wheel mode, continuing to extrapolate as if the downstream signal had not been reacquired. Upon successful locking of the downstream clock recovery circuit (via the primary NCO), averaging the phase difference between the primary NCO and the fly wheeling secondary NCO can provide the calibration information necessary to bring the second downstream transmitter 290b into phase alignment with the downstream symbol clock of the first downstream transmitter 290a. This value is provided over the command bus to the synchronizing phase shift register of the second downstream transmitter 290b.

The calibration procedure can be repeated to verify that the first and second downstream transmitters 290 are in downstream symbol clock phase alignment to a sufficient degree. For example, the symbol clock alignment can be within one nanosecond according to an embodiment.

5.0 Calibrating FEC Frame Alignment of Two Downstream Transmitters Already Synchronized in Symbol Clock Phase Once the second downstream transmitter 290b is synchronized to the first downstream transmitter 290a in its downstream symbol clock phase, alignment of the FEC framing of the downstream transmitters 290 can be determined. The downstream transmitters 290 are generally configured in identical modes of QAM and FEC, though interleaver parameters can be different in some embodiments. Data content is generally irrelevant to this PHY layer technique, unless an unnecessary control is applied.

The TSR 296 can lock up to the downstream transmission of the first downstream transmitter 290a. In an embodiment, the inner TCM code is decoded, the frame sync trailer is identified, and FEC frame sync is achieved. The input to the TSR 296 is switched over to the second downstream transmitter 290b. According to an embodiment, a command is set in the TSR 296 "informing" it of the impending test, and upon recognizing the brief loss of input signal, the TSR 296 can lock to the second downstream signal.

In an embodiment, symbol clock recovery can occur without a cycle slip, due to the tight alignment of the phases of the downstream transmitters 290 and the brief nature of the interruption. According to an embodiment, the TSR 296 achieves puncture alignment for the TCM and "finds" the unique word in the framing from the second downstream transmitter 290b.

By counting QAM symbols, and assuming no cycle slip in the recovery of the symbol clock for the second downstream transmitter 290b, the spacing in units of QAM symbols between the frame sync unique words of the first and second downstream transmitters 290 can be measured. This spacing between the unique words of the downstream transmitters 290 in units of QAM symbols is provided by the calibration information discussed in Section 1.0.

After achieving symbol clock alignment of the first and second downstream transmitters 290, the FEC frame alignment value can complete the alignment and calibration necessary at the CMTS 104 to switch from the first downstream transmitter 290a to the second downstream transmitter 290b. For example, the cable modem 108 can be capable of transmitting on an S-CDMA upstream with the required level of timing precision without re-ranging. According to an embodiment, it is necessary to communicate the FEC alignment value to the downstream receiver 310 before the downstream receiver 310 can resume S-CDMA upstream transmission after locking onto the second downstream transmitter 290b.

6.0 Cable Modem Recognition of New Transmitter

The cable modem 108 can determine whether a fixed timing error is less than a predetermined value. However, the reacquired downstream signal might not be from the same source as the original signal. For example, it might be necessary to switch from one downstream transmitter 290 to another. The downstream signals of the two downstream transmitters 290 can have the same frequency if they are locked to the same master clock, for example. However, the phases, power levels, and/or path delays of the signals can be different. For instance, one of the signals can be re-routed the opposite direction around a ring architecture.

If a switch occurs, so that the cable modem 108 begins receiving a downstream signal from a second downstream transmitter 290*b* that is not synchronized with the first (i.e. original) downstream transmitter 290*a*, the cable modem 108 traditionally must re-range. If the first and second downstream transmitters 290 are synchronized at the PHY layer, however, re-ranging can be avoided in an embodiment.

In order to determine whether the first and second downstream transmitters 290 are synchronized in some respect, a downstream ID can be added in the downstream MAC information according to an embodiment. A first ID can identify the first downstream transmitter 290, for example. If the ID changes during transmission of the downstream signal, the cable modem 108 can determine that the downstream signal is being received from a different downstream transmitter 290, such as the second downstream transmitter 290*b*.

According to an embodiment, the cable modem 108 determines whether the first and second downstream transmitters 290 are synchronized based on the ID of each transmitter 290. The cable modem 108 can retrieve the sync trailer characterization information from the downstream signals. In an embodiment, a cable modem 108 experiencing a downstream interruption can wait for a valid downstream ID before transmitting upstream. A downstream ID can be transmitted every 100 ms or 200 ms, to provide some examples.

A rough estimate indicates that an MPEG packet transmitted every 200 ms constitutes no more than approximately 0.03% of the downstream capacity. More efficient means of conveying the downstream ID can likely be found, such as in reserved bits of the trailer sync. In an embodiment, providing the downstream ID allows the cable modem 108 to recognize that a new downstream transmitter 290 is being used.

The downstream ID can convey other information to the cable modem 108, such as whether the second downstream transmitter 290*b* is synchronized to the first downstream transmitter 290*a*, and if so, to what level. For instance, the downstream ID can include information regarding the offset between the sync trailers of the symbol-synchronized downstream transmitters 290 according to an embodiment.

According to an embodiment, baud clocks in the modulator are synchronized and their power levels are matched, so that the second downstream signal appears to be the same as the first downstream signal when received by the cable modem 108. The first and second downstream signals might not take the same path to the cable modem 108. For example, a fiber ring can be broken, causing the downstream signal to be automatically routed in the opposite direction around the ring. The different paths taken by the two downstream signals can result in the signals having different path delays. Significant delays can be corrected using offsets at the CMTS 104, for example.

Sync trailers can be used to resolve ambiguity once the baud clocks are synchronized. Any amount of offset between downstream signals can be tolerated in principle, if it is measured at the CMTS 104 and sent down in a MAC message, so that the cable modem 108 can compensate when it locks to the new downstream signal. In an embodiment, a delay measurement module is used at the CMTS 104 to keep track of the delays of the downstream transmitters 290. For instance, the delay measurement module can be a TSR 296 located at the CMTS 104 or somewhere else in the communication system 100.

The symbol clocks of the downstream transmitters 290 can be synchronous, meaning the symbol clocks are locked to a common source. The symbol clocks are typically manipulated so that they are in phase with each other. In an embodiment, an add register leading to the counter register in the modulator symbol clock NCO can be read and set. For instance, trial and error resets can be performed, some delay lines on the reference frequency leading to a modulator can be trimmed, and/or clock cycles on the reference input can be deleted.

The cable modem 108 can generally lock to either edge of the downstream signal. For example, suppose the cable modem 108 locks to a first downstream signal with a baud clock phase of 0 degrees. The first downstream signal is lost and is replaced by a second downstream signal with a baud clock phase of 180 degrees. The modem is equally likely to lock to the edge at −180 degrees as it is to lock to the edge at +180 degrees in an embodiment.

The TCM puncture alignment or the sync trailer can resolve a one or two symbol clock offsets or cycle slips in the downstream receiver 310. The downstream receiver 310 generally must find these offsets in order to decode the downstream signal. Determining the number of cycle slips can be as simple as monitoring how far the downstream receiver 310 has to "move" from its initial position once the downstream symbol clock is locked.

Having all downstream receivers 310 use the FEC lock to find the "correct" symbol edge can mitigate the need for headend messaging. For example, downstream receivers 310 generally must be locked to the same downstream signal or locked to a completely synchronous downstream signal (including symbol phase), and downstream receivers 310 typically must achieve FEC lock.

A headend message can often ease the situation in any of the following ways:

1. Locking two or more downstream transmitters 290 at the FEC level can be difficult. The downstream receivers 310 can have unsynchronized FEC alignment, so long as the cable modems 108 can find the master. For example, having unsynchronized FEC alignment can enable switching from the first downstream transmitter 290*a* to the second downstream transmitter 290*b*, where the second downstream transmitter 290*b* has a different FEC alignment in time as compared to the first downstream transmitter 290*a*, and the upstream frames can remain unglitched. In an embodiment, the TSR 296 at the headend can be used to calibrate the offset between the first and second downstream transmitters 290.

2. Multiple downstream transmitters 290 are able to transmit to cable modems 108 operating on the same upstream channel without requiring the downstream transmitters 290 to be synchronized at the FEC level in an embodiment, if the cable modems 108 can determine how many symbols to move from their FEC sync to regain alignment with the master downstream transmitter 290, for example.

3. If a cable modem 108 determines where the sync trailer will be after the switchover from the first downstream transmitter 290*a* to the second downstream transmitter 290*b*, as compared to where the sync trailer is before the switchover, then the cable modems 108 can rapidly reacquire the new downstream signal in an embodiment. For example, the switchover can occur using redundancy switching or some other method of achieving a rapid switchover to the second downstream transmitter 290*b*. In an embodiment, switching speed can be enhanced if the second downstream signal is synchronized in symbol phase with the first downstream signal before the switchover occurs.

If different upconverters are used for the different downstream signals, switchover can be facilitated by ensuring that the local oscillators (LOs) of the upconverters are synchronous. For example, having synchronous LOs can facilitate the second downstream signal having the same carrier frequency as the first downstream signal.

Annex A generally uses a Reed-Solomon technique with a long block size. For an interrupted downstream signal from a single downstream transmitter 290, finding the codeword alignment provides resolution of the downstream symbol clock alignment to approximately +/−100 bytes. For example, +/−100 bytes represent +/−100 symbols at 256 QAM and more at 64QAM. As with Annex B, the PHY layer FEC can be used to increase the unambiguous "range" of the downstream timing. Frame syncs in the Annex A transmission can provide a larger unambiguous "range" according to an embodiment.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A cable modem for receiving downstream transmissions from a cable modem termination system (CMTS), comprising:
   a clock generation element configured to determine a first clock using first timing information from a first downstream signal to provide a symbol clock and, when the first downstream signal is lost, to determine second timing information from a second downstream signal using the symbol clock to provide a second clock and to maintain the symbol clock in accordance with the first timing information;
   an offset determination element configured to determine an offset between the first and second clocks when the first downstream signal is lost; and
   an upstream timing element configured to adjust the symbol clock based upon the offset.

2. The cable modem of claim 1, further comprising:
   an upstream transmitter configured to synchronize upstream transmissions to the CMTS using the symbol clock.

3. The cable modem of claim 1, further comprising:
   a loss detection element configured to detect a loss of the first downstream signal.

4. The cable modem of claim 3, wherein the loss detection element is further configured to detect the loss of the first downstream signal based on a notification message received from the CMTS.

5. The cable modem of claim 4, wherein the clock generation element is further configured to receive the notification message prior to the CMTS terminating transmission of the first downstream signal.

6. The cable modem of claim 2, wherein the first and second downstream signals correspond to a first and second downstream CMTS transmitter, respectively, and wherein the upstream transmitter is further configured to handoff synchronization between the first and second CMTS downstream transmitters at a time substantially coinciding with the offset being determined.

7. The cable modem of claim 1, further comprising:
   a forward error correction (FEC) synchronization element configured to provide a difference in FEC alignment between the first and second downstream signals.

8. The cable modem of claim 7, wherein the offset determination element is further configured to determine the offset based on the difference in FEC alignment.

9. The cable modem of claim 1, wherein the offset determination element is further configured to determine the offset based on an offset necessary to obtain a valid puncture alignment or a valid frame alignment between the first and second downstream signals.

10. A cable modem configured to receive downstream transmissions from a cable modem termination system (CMTS), comprising:
    a clock generation element configured determine a first clock using first timing information from a first downstream signal to provide a symbol clock and, when the first downstream signal is lost, to determine second timing information from a second downstream signal using the symbol clock to provide a second clock, and to provide a forward-predicted version of the first clock;
    an offset determination element configured to determine an offset between the first and second clocks when the first downstream signal is lost;
    an upstream timing element configured to adjust the forward-predicted version of the first clock based on the offset; and
    an upstream transmitter configured to synchronize upstream transmissions to the CMTS using the forward-predicted version of the first clock.

11. The cable modem of claim 10, further comprising:
    a loss detection element configured to detect a loss of the first downstream signal.

12. The cable modem of claim 11, wherein the loss detection element is further configured to detect the loss of the first downstream signal based on a notification message received from the CMTS.

13. The cable modem of claim 12, wherein the clock generation element is further configured to receive the notification message prior to the CMTS terminating transmission of the first downstream signal.

14. The cable modem of claim 10, wherein the first and second downstream signals correspond to a first and second downstream CMTS transmitter, respectively, and wherein the upstream transmitter is further configured to handoff synchronization between the first and second CMTS downstream transmitters at a time substantially coinciding with the offset being determined.

15. The cable modem of claim 10, further comprising:
    a forward error correction (FEC) synchronization element configured to provide a difference in FEC alignment between the first and second downstream signals, and wherein the offset determination element is further configured to determine the offset based on the difference in FEC alignment.

16. A method in a cable modem, the method comprising:
    determining a first clock using first timing information from a first downstream signal to provide a symbol clock;
    maintaining the symbol clock in accordance with the first timing information when the first downstream signal is lost;
    determining second timing information from a second downstream signal using the symbol clock to provide a second clock when the first downstream signal is lost; and
    adjusting the symbol dock based upon an offset between the first and second clocks.

17. The method of claim 16, further comprising:
synchronizing upstream transmissions to a cable modem termination system (CMTS) using the symbol clock.

18. The method of claim 17, further comprising:
detecting a loss of the first downstream signal when the first downstream signal is not transmitted by the CMTS.

19. The method of claim 16, further comprising:
determining the offset using a difference in forward error correction (FEC) alignment between the first and second downstream signals.

20. The method of claim 16, further comprising:
determining the offset based on an offset necessary to obtain a valid puncture alignment or a valid frame alignment between the first and second downstream signals.

* * * * *

UNITED STATES PATENT AND TRADEMARK OFFICE
CERTIFICATE OF CORRECTION

| | |
|---|---|
| PATENT NO. | : 8,804,607 B2 |
| APPLICATION NO. | : 13/875127 |
| DATED | : August 12, 2014 |
| INVENTOR(S) | : Kolze et al. |

It is certified that error appears in the above-identified patent and that said Letters Patent is hereby corrected as shown below:

In the Claims

Column 20, line 66, please replace "adjusting the symbol dock" with --adjusting the symbol clock--.

Signed and Sealed this
Eleventh Day of November, 2014

Michelle K. Lee
*Deputy Director of the United States Patent and Trademark Office*